April 18, 1933.  E. H. FREEMAN  1,904,438
INTEGRATING METER
Original Filed Sept. 13, 1922
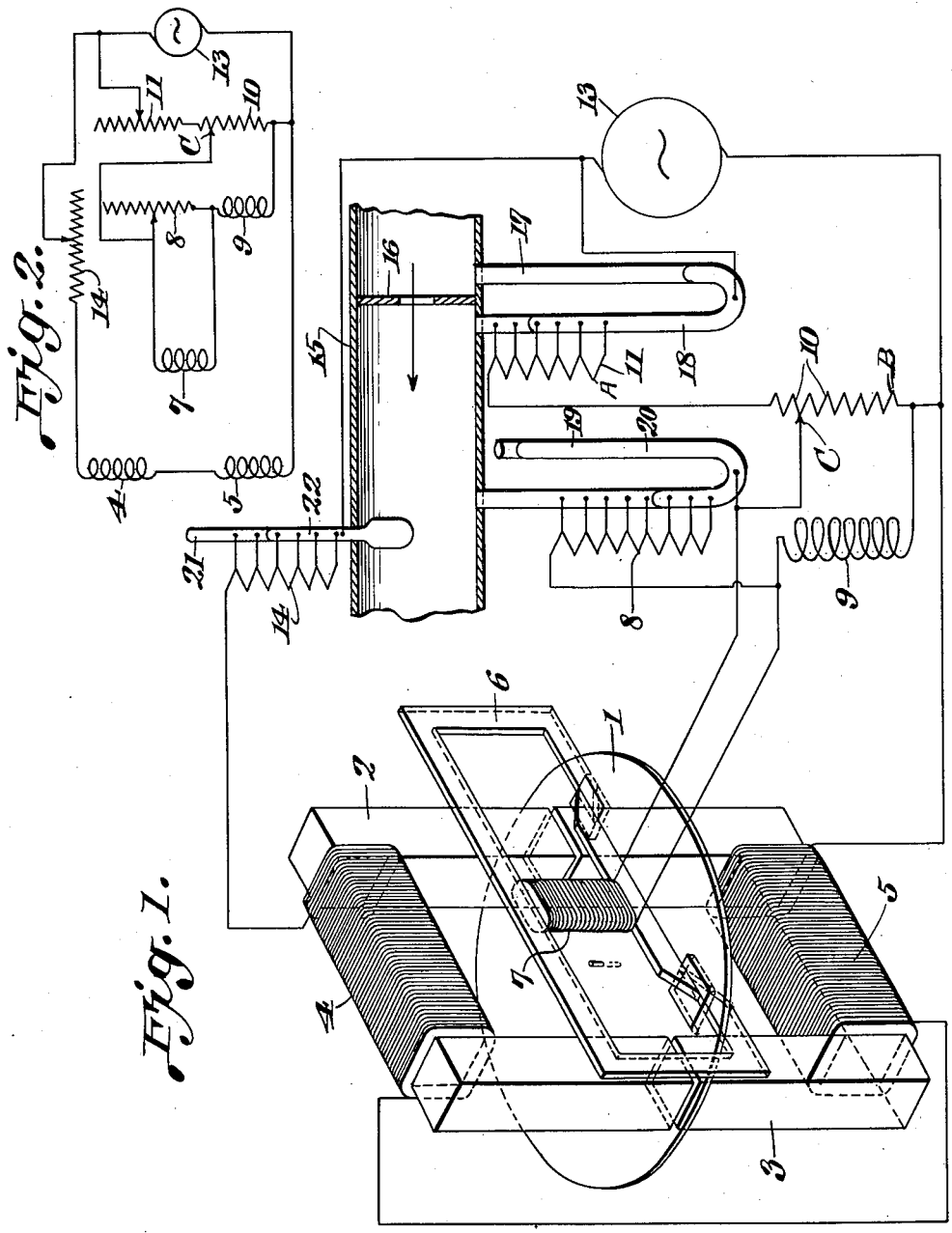
Inventor
Ernest H. Freeman
By Nissen & Crane Attys.

UNITED STATES PATENT OFFICE

ERNEST H. FREEMAN, OF WILMETTE, ILLINOIS, ASSIGNOR TO REPUBLIC FLOW METERS CO., OF CHICAGO, ILLINOIS, A CORPORATION OF ILLINOIS

INTEGRATING METER

Original application filed September 13, 1922, Serial No. 587,942. Divided and this application filed August 12, 1927. Serial No. 212,407.

The invention relates to certain features of an electrically operated flow meter whereby the indication of the meter is not only rendered substantially independent of the usual fluctuations in the voltage and in the frequency of the source of the electric energy by which the meter is operated, but is also automatically corrected for the effect of the pressure and the temperature of the fluid measured. Means are also shown by which a correction for specific gravity may be made. It is thus possible to obtain an accuracy in the indication which has not heretofore been possible with the type of meter used.

The invention is exemplified in the combination and arangement of parts shown in the accompanying drawing and described in the following specification, and it is more particularly pointed out in the appended claims.

This application is a division of my co-pending application, Serial No. 587,942, filed September 13, 1922.

In the drawing—

Fig. 1 is a diagrammatic view showing one embodiment of the invention; and

Fig. 2 is a circuit diagram of the electrical connections of Fig. 1.

In Fig. 1 of the drawing, a disc 1 of conducting material is supported for rotating by a suitable frame, not shown, the supporting spindle for the disc being connected with any well-known form of counter for registering the amount of rotation of the disc for a period of time in the manner usual with integrating meters.

The rotatable disc 1 of conducting material is symmetrically placed between the poles of electro-magnets whose cores 2 and 3 are excited by alternating current through the windings 4 and 5 from the source 13, the resistor 14 being in series with these windings and the source. The windings 4 and 5 are so connected that the magnetic flux of the cores 2 and 3 passes mainly in a perpendicular direction through the disc 1.

A second electro-magnet has a core 6 excited by alternating current through the winding 7. The flux of this magnet passes perpendicularly through the disc 1 near the flux of the previously described magnet.

The flux set up by the magnet cores 2 and 3 reacts with the current induced in the disc 1 by the flux of the magnet core 6 and the flux of the magnet core 6 reacts with the current induced in the disc 1 by the flux of the cores 2 and 3 and since the fluxes of the two magnets are out of phase, as will be explained later, a torque is produced which rotates the disc. The relation of this accelerating torque, $T_a$, to the principal quantities upon which it depends is quite closely given by the following expression:

$$T_a \propto \varphi_1 \varphi_2 f \frac{\sin \theta \cos \beta}{Z}$$

in which
 $\varphi_1$ = flux through cores 2 and 3,
 $\varphi_2$ = flux through cores 6,
 $f$ = frequency,
 $\theta$ = phase angle between $\phi_1$ and $\phi_2$,
 $\beta$ = phase angle between the E. M. F.'s induced in the disc and their corresponding currents,
 $Z$ = impedance of the circuits in the disc.

As the disc rotates, it cuts across the two fluxes, $\varphi_1$ and $\varphi_2$, and currents are induced in the disc which oppose its motion. By construction, the flux $\varphi_2$ is made so small in comparison with the flux $\varphi_1$, that practically all of the retarding torque is due to motion through the flux $\varphi_1$. The relation of this retarding torque, $T_r$, to the principal quantities upon which it depends is given by the following expression:

$$T_r \propto \omega \varphi_1^2$$

in which
 $\omega$ = angular velocity
 $\varphi_1$ = flux through cores 2 and 3, as before.

For steady conditions, the disc will have such a speed that, neglecting friction, $$T_a = T_r$$

hence $$\omega \propto \frac{\varphi_2 f \sin \theta \cos \beta}{\phi_1 Z}$$

An inspection of the circuits will show that the circuits in which the two magnet windings are placed receive their electro-motive force from the same source 13 so that a change in the voltage of the source 13, other things remaining constant, will change $\varphi_1$ and $\varphi_2$ substantially proportionately, and consequently the angular velocity is independent of the voltage of the source 13. This is practically true so long as the iron in the cores of the magnets is below magnetic saturation and the air gaps constitute nearly all of the reluctance in the magnetic circuits. Such independence of the voltage is a very desirable characteristic in an electrically operated flow meter since the flow which is to be measured by the meter has no connection with fluctuations in voltage that are produced by independent causes.

Similarly, the meter should be independent of the usual changes in frequency. This result has been attained by an arrangement of circuits shown in Figs. 1 and 2 and described below.

Two resistors 10 and 11, are connected in series to the source 13. A reactor 9 and a resistor 8 are connected in series, the two being in parallel with the resistor 10. The reactance of 9 is several times greater than the resistance of 8 so that the impedance of 8 and 9 is nearly all due to the reactance of 9. This impedance is several times the resistance of 10. The winding 7 is connected in parallel with the resistance 8. The impedance of the winding 7 is nearly all reactance and is several times the resistance of 8.

The current through the reactor 9 will vary nearly inversely as the frequency, hence the drop over the resistor 8, which is the voltage applied to the winding 7, will vary nearly inversely as the frequency. But the current in the winding 7 varies directly as the voltage applied to it and nearly inversely as the frequency, hence this current, and therefore the flux varies inversely as the square of the frequency, approximately.

The windings 4 and 5 are highly reactive, their impedance being greater than the resistance of 14, so that the current in these windings, and therefore the flux $\varphi_1$, varies nearly inversely as the frequency.

Substituting these relations between the fluxes and the frequency in the previously given expression for the angular velocity, which is $$\omega \alpha \frac{\phi_2 \sin \theta \cos \beta}{\phi_1 Z}$$

gives $$\omega \alpha \frac{\left(\frac{1}{f^2}\right) f \sin \theta \cos \beta}{\frac{1}{f} Z} \alpha \frac{\sin \theta \cos \beta}{Z}$$

which shows that the angular velocity is independent of the frequency on the basis of the assumptions made except insofar as changes in the frequency may affect $\sin \theta \cos \beta / Z$. By so designing the circuits that the two fluxes are approximately in time quadrature for the average frequency of the source 13, the usual variations of frequency found in practice will have little effect on $\sin \theta$, $\cos \beta$, or Z, hence the indications of the meter are substantially independent of the ordinary changes in frequency found in light and power circuits.

There remain to be described the methods whereby the meter indicates the quantity of a flowing fluid corrected for the effects of pressure, temperature and specific gravity.

A pipe 15, shown in longitudinal section in Fig. 1, carries the fluid to be measured. This fluid passes through an orifice 16, or any other device producing a drop in pressure, in the direction of the arrow. A U-tube 17 containing the mercury 18 is connected on either side of the orifice 16 so that the pressure drop causes the mercury to rise on one side and short circuit more or less of the resistor 11. The combination is so designed that the conductance between the points A and B through the resistors 10 and 11 varies directly as the velocity of the fluid through the orifice 16.

The angular velocity of the disc 1 varies directly as this conductance and hence directly as the velocity of the fluid. The angular velocity of the disc, being independent of variations in voltage and frequency, is controlled substantially entirely by the characteristics in the circuits themselves which can be caused to vary according to changes in rate of flow and in other characteristics of the flowing fluid to be measured. One means of securing this result is shown diagrammatically by way of illustration.

A U-tube 19 containing the mercury 20 functions like a static pressure gage and causes the resistance of the resistor 8 to be increased with an increase in the static pressure. Other types of pressure gages may be used similarly. A change in the resistance of 8 changes the speed of the disc 1 of the meter, hence it becomes possible to have the meter indicate automatically the qauntity of a fluid, such as a gas, at some standard pressure while the measurement may be made at another pressure. If the pressure increases, more of the fluid will flow for a given velocity and the increase in the resistance 8 will result in a corresponding increase in the velocity of the disc.

A thermometer 21 containing the mercury 22 serves to modify the resistor 14 as the temperature of the fluid varies. Other types of thermometers may be used. A change in the resistance of 14 affects the speed of the disc 1 and the combination is so designed that the indication of the meter gives the quantity of the fluid at some standard temperature while the measurement may be made at another temperature.

The movable contact C on the resistor 10 can be moved so as to change the resistance between A and C. This change affects the speed of the meter and by this means its indication can be made correct for fluids of different densities.

It is to be understood that while certain resistances have been specified to take care of the effects of the variable factors velocity, pressure, temperature and specific gravity in measuring the flow of a fluid, there will be no departure from the spirit of the invention if some or all of these are interchanged. For example, the resistors 8 and 14 have been specified as taking care of changes in pressure and temperature, respectively. It is possible to have the resistor 8 correct for temperature and the resistor 14 for pressure. Other combinations are also possible.

I claim:—

1. In an integrating meter, a rotor, two alternating current magnets acting on said rotor to produce accelerating torque thereon, one of said magnets acting also to produce the principal retarding torque on said rotor, and impedances in the circuit of one of said magnets to effect a quadrature phase relation between the fluxes induced by said magnets to render the meter substantially free of frequency errors.

2. An integrating meter of the induction type in which the accelerating torque is supplied by electro-magnetic means energized from an alternating current supply, and means in circuit with said electro-magnetic means for rendering the changes in frequency ineffective to affect the registration of the meter.

3. An integrating conductance meter of the induction type in which the retarding torque and the accelerating torque are supplied by electro-magnetic means energized from the same source of alternating current supply, the electro-magnetic means for producing the accelerating torque being supplied through a reactive circuit adjusted to compensate said meter for errors due to variations in frequency.

4. An integrating meter of the induction type in which the driving force is supplied by electromagnetic means energized from an alternating current supply and means for automatically controlling the driving force thus supplied in response to changes in frequency for compensating the meter for frequency errors.

5. An integrating meter of the induction type in which the retarding force and the accelerating force are supplied by electromagnetic means energized through the same source of alternating current supply, and impedance means for maintaining the vector sum of said forces substantially constant over a limited range of variation in the frequency of the alternating current supply.

6. In an integrating meter, a rotor operable at different speeds to measure the variation in the medium to be integrated, a magnetic circuit having therein a voltage magnet and two gaps through which said rotor revolves, a current magnet in the circuit operable adjacent to both of said gaps whereby there are two opposing torques, the voltage flux being a preponderating flux to supply practically all of the brakage and impedance means in the circuit of one of said magnets to effect a quadrature phase relation between the fluxes induced by said magnets in order to render the meter substantially independent of frequency variations.

7. In an integrating meter, a rotor operable at different speeds to measure the variations in the medium to be integrated, two alternating current magnets one for voltage and one for current acting on said rotor, the voltage flux predominating to supply both accelerating and braking torque and being inherently independent of frequency changes, and means for automatically controlling the torque produced by one of said magnets in response to variations in a factor.

8. In combination, a rotor operable at different speeds to measure the variation in the medium to be integrated, a pair of alternating current electro-magnets having the fluxes thereof cut by said rotor so that currents will be induced by each magnet in said rotor to react upon the flux of the other magnet producing an accelerating torque in said rotor, the flux produced by one of said magnets being many times that produced by the other of said magnets so that the retarding torque due to the flux of the last-named magnet is practically negligible, a common source of alternating electro-motive force for energizing said magnets, and impedance elements for displacing the phase relation of the fluxes in said magnets relative to one another to cause the operation to be independent of frequency variations.

9. In an integrating meter, a rotor, two alternating current magnets acting on said rotor to produce both accelerating and retarding forces thereon, a common source of alternating current for energizing said magnets, a variable impedance in the circuit of one of said magnets to vary the said accelerating force, an additional impedance means in circuit with the last named magnet to cause the flux induced by it to lag the flux induced by the other magnet approximately 90 degrees and thereby render the meter substantially free of frequency errors.

In testimony whereof I have signed my name to this specification on this 7th day of June, A. D. 1927.

ERNEST H. FREEMAN.